United States Patent [19]

Kadota et al.

[11] 4,136,332
[45] Jan. 23, 1979

[54] DEVICE FOR DETECTING DISPLACEMENT BETWEEN PATTERNS

[75] Inventors: Shozo Kadota; Yoshiji Fujimoto, both of Hachioji, Japan

[73] Assignee: Hitachi, Ltd., Japan

[21] Appl. No.: 762,716

[22] Filed: Jan. 26, 1977

[30] Foreign Application Priority Data

Jan. 30, 1976 [JP] Japan .................................. 51/8478
Jan. 30, 1976 [JP] Japan .................................. 51/8481

[51] Int. Cl.² .............................................. G06K 9/12
[52] U.S. Cl. ...................... 340/146.3 H; 340/146.3 Q
[58] Field of Search ................. 340/146.3 H, 146.3 Q, 340/146.3 MA, 146.3 AH; 235/181; 364/432, 455, 456, 819, 822

[56] References Cited

U.S. PATENT DOCUMENTS

| | | |
|---|---|---|
| 3,223,973 | 12/1965 | Chatten .......................... 340/146.3 H |
| 3,231,860 | 1/1966 | Chatten .......................... 340/146.3 H |
| 3,506,807 | 4/1970 | Malaby .......................... 340/146.3 H |
| 3,587,047 | 6/1971 | Cutaia ........................... 340/146.3 H |
| 3,849,762 | 11/1974 | Fujimoto et al. .............. 340/146.3 Q |
| 3,898,617 | 8/1975 | Kashioka et al. ........... 340/146.3 AH |
| 4,014,000 | 3/1977 | Uno et al. .................. 340/146.3 MA |

*Primary Examiner*—Leo H. Boudreau
*Attorney, Agent, or Firm*—Craig & Antonelli

[57] ABSTRACT

Disclosed is a device for detecting a displacement between patterns comprising a picking-up device, first and second memory means for storing a first and a second patterns picked up by said picking up device, means for shifting said first and second patterns relative to each other thereby obtaining a correlation value for each shift between them, means for obtaining a maximum correlation value and deriving a displacement in terms of the number of shifts which gives said maximum correlation value.

11 Claims, 20 Drawing Figures

DEVICE FOR DETECTING DISPLACEMENT BETWEEN PATTERNS

BACKGROUND OF THE INVENTION

The present invention relates to a device for detecting a displacement between patterns particularly adapted for use in a scanning system of an optical character reader.

There have been devised and demonstrated various scanning systems for optical character readers. In one system a mechanical scanner or flying-spot scanner including a point source of light is used for two-dimensionally scanning a pattern bearing sheet so that light reflected back from the sheet may be converted into electrical signals by a receptor, such as a photoelectron multiplier. In another system a character or pattern bearing sheet is one- or two-dimensionally illuminated by a light source, such as a lamp, and a one-dimensional receptor, such as a photocell, scans the sheet in a one-dimensional manner. In a further system, a pattern bearing sheet is two-dimensionally illuminated and a two-dimensional image-pickup device is used to two-dimensionally pick up patterns or characters. However, the above-mentioned prior art scanning systems have some problems to be described below. First, in the system wherein the one-dimensional scanner scans patterns or characters one-dimensionally, the linearity of the scanned pattern is good in the direction in which the scanning elements are arrayed, but the image scanned pattern is distored in the scanning direction. In the system wherein the two-dimensional scanner is used, a pattern without accompanying scanning distortion may be obtained, but when the scanner cannot cover a pattern field of a sufficiently large area, two-dimensional patterns must be correctly connected to each other. Recently, two-dimensional photocells have been devised and demonstrated, so that scanners are made very compact in size to such an extent that a manual scanner which may be held by an operator for manual scanning may be provided. With the manual scanner the connection or continuity between the pattern images presents a very important problem.

To solve this problem, there has been devised and demonstrated a system in which every time an individual pattern in the receptor field is picked up, any overlapped portions are eliminated from the read-out result. However, the use of this system is limited to an optical character reader having a sufficiently high processing speed.

The manual scanners have a defect that unless correctly operated an optical character reader cannot correctly sense and recognize. For instance, if an operator fails to scan scan in parallel with a row, the detected character will be skewed. If the scanning speed is too fast, the next character is picked up before the preceding character has been processed and recognized. On the other hand, when the scanning speed is too slow, the same character may be picked up twice. One of the methods for solving these problems is to give suitable information to an operator so that the correct manual scanning may be accomplished.

SUMMARY OF THE INVENTION

The primary object of the present invention is therefore to provide a device for detecting the displacement between a pattern just picked up and the pattern picked up immediately prior thereto so that the correct connection or continuity between them may be obtained.

Another object of the present invention is to provide a device for detecting a displacement between patterns of the type capable of giving an alarm signal to an operator whenever he makes an erroneous scanning with a manual scanner.

To the above and other ends, in a device for optically detecting a displacement between patterns in accordance with the present invention, patterns are picked up at a predetermined time interval and a correlation value between a first pattern and a second pattern picked up immediately after the first pattern is obtained every time first and second detected patterns are shifted relatively to each other so that the displacement between the first and second patterns may be detected from the maximum correlation value among correlation values obtained by shift of the respective numbers. More specifically the first and second patterns are shifted relative to each other by one elementary square, column or row to obtain a correlation value. If a maximum correlation value is obtained when they are shifted by i squares, columns or rows, the displacement is defined as i.

If the direction of the scanning is not in parallel with a row; that is, when the scanning is skewed, horizontal and/or vertical shifts or displacements between the first and second patterns in the receptor fields results. Therefore, they are shifted horizontally or vertically relative to each other to obtain a correlation value to be defined later between them and the number of shifts giving a maximum correlation value is a measure of the displacement between them. That is, when the maximum correlation value is obtained when they are shifted horizontally to the left or right by i columns and vertically upward or downward by j rows, the displacement is then defined as i columns or squares left or right and j rows or squares to the upward or downward.

Furthermore, according to the present invention, it is detected whether the displacement between the first and second patterns in the receptor fields is within a predetermined range or not. If it is out of the predetermined range, an alarm signal is generated to caution an operator about his erroneous scanning. More specifically, the horizontal and vertical displacements are obtained in the manner described above, and if the horizontal displacement to the left or right is less than a predetermined value, a "TOO SLOW" signal is generated. On the other hand, if the displacement is in excess of the predetermined value, a "TOO FAST" signal is generated. When the vertical displacement in either upward directions or downward is in excess of a predetermined value, a "UPWARD or DOWNWARD DISPLACEMENT" signal is generated.

In practice it is of course not necessary to generate all of the above four alarm signals. For instance, when a manual scanner is so arranged as to eliminate the vertical displacement, the "UPWARD and DOWNWARD DISPLACEMENT" signals are of course not necessary. Furthermore, if a character reader has a sufficiently high processing speed, it is not necessary to give the "TOO FAST" alarm signal.

BRIEF DESCRIPTION OF THE DRAWINGS

Same reference numerals are used to designate similar parts throughout the figures.

DESCRIPTION OF THE PREFERRED EMBODIMENTS

Underlying Principle, FIG. 1

The underlying principle of the present invention will be described with reference to FIG. 1 showing a pattern in two pickup fields displaced from each other to the right or left. FIGS. 1(b) and 1(c) show a pattern picked up by a two-dimensional pickup device at a first pickup field (200) indicated by the solid lines in FIG. 1(a) and at a second pickup field (201) indicated by the broken lines in FIG. 1(a). FIGS. 1(e)–1(i) show the steps for shifting by one column or square in each step the patterns shown in FIGS. 1(b) and (c) so that they may be correctly superposed upon each other, as shown in FIG. 1(i). FIG. 1(d) shows the patterns shown in FIGS. 1(b) and (c) when their pickup fields are superimposed. This condition or state may be expressed in terms of a shift number of shift = 0 and, for example, a correlation value = 131. The pattern shown in FIG. 1(b) has its profile indicated by the solid lines, whereas the pattern shown in FIG. 1(c) has its profile indicated by a set of small dots. The overlapped portions are indicated by large dots, the number of which is a correlation value. As seen from FIGS. 1(d)–1(i), when they are shifted to the right or left by five columns or squares, they are correctly superposed upon each other so that a maximum correlation number results. Conversely, it is detected that the pattern shown in FIG. 1(c) is displaced by five columns or squares to the right with respect to the pattern shown in FIG. 1(b). The number of shifts and the resulting correlation values in the steps from FIG. 1(d) to FIG. 1(i) are shown below:

| FIG. 1 | Number of shifts | Correlation values |
|---|---|---|
| (d) | 0 | 131 |
| (e) | 1 | 149 |
| (f) | 2 | 189 |
| (g) | 3 | 228 |
| (h) | 4 | 260 |
| (i) | 5 | 290 |

When the displacement of a pattern in the first pickup field relative to the pattern in the second pickup field picked up in the preceding step, it becomes possible to correctly transfer the continuous patterns into a pattern recognition device without any overlap upon patterns in the first and second pickup fields or without providing a gap between the patterns. More specifically, this will be described with respect to a case where the pickup device is shifted from the left to the right. As the pickup device is shifted from the left to right, it picks up blank or white squares first and then pickup the leftward portions of a character. It is assumed that a first pattern will be transmitted to the pattern recognition device when the left boundary of a pickup field of the pickup device coincides with the left boundary of the character pattern. When the pickup field has N columns of elementary squares, the second pattern is picked up after the pickup device has been shifted by N columns or squares to the right. If the second pattern is picked up at a time when the pickup device has not shifted by N columns or squares, the first and second detected patterns overlap. On the other hand, when the next pattern is picked up after the pickup device has shifted in excess of N columns or squares, a discontinuity between the first and second detected patterns results. That is, a gap results between them. However, it is not necessary to cause the pickup device to pick up a pattern after it has correctly been shifted by N columns or squares. That is, no problem arises when the next pattern is picked up when the pickup device has shifted to a permissible range slightly different from the N columns or squares. The pickup device picks up patterns at a predetermined time interval. Therefore when the displacement between the patterns in the continuous two pickup fields is of small value, the second pattern may be transmitted to the pattern recognition device when the sum of the displacements equals N or reaches a permissible range after the first pattern has been transmitted to the recognition device.

When the adjacent character patterns are spaced apart from each other by a sufficient distance and if the pickup device may detect the gap or spacing therebetween, in the step for picking up a first pattern, the distance H between the left and right boundaries of a character pattern is obtained, and when the sum the displacements equals to H, a second pattern may be transmitted to the pattern recognition device so that character pattern segmenting or partitioning may be eliminated.

Figure 1A:
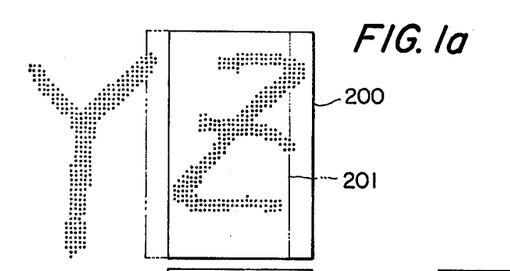
FIG. 1 shows patterns used for the explanation of the underlying principle of the present invention.
Figure 1B:
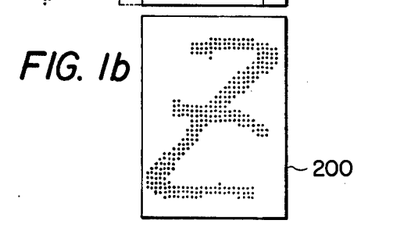
Figure 1C:
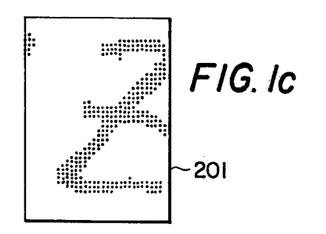
Figure 1D:
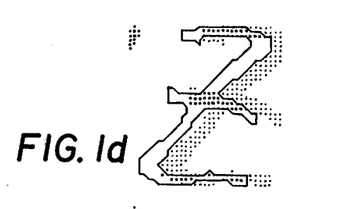
Figure 1E:
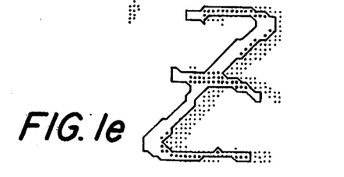
Figure 1F:
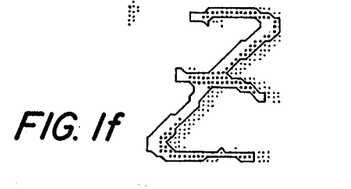
Figure 1G:
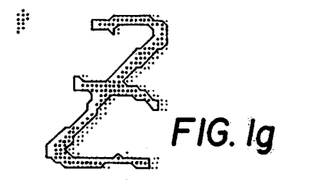
Figure 1H:
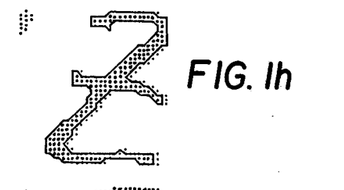
Figure 1I:
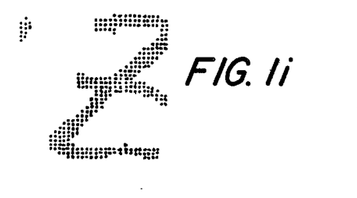
Figure 2:
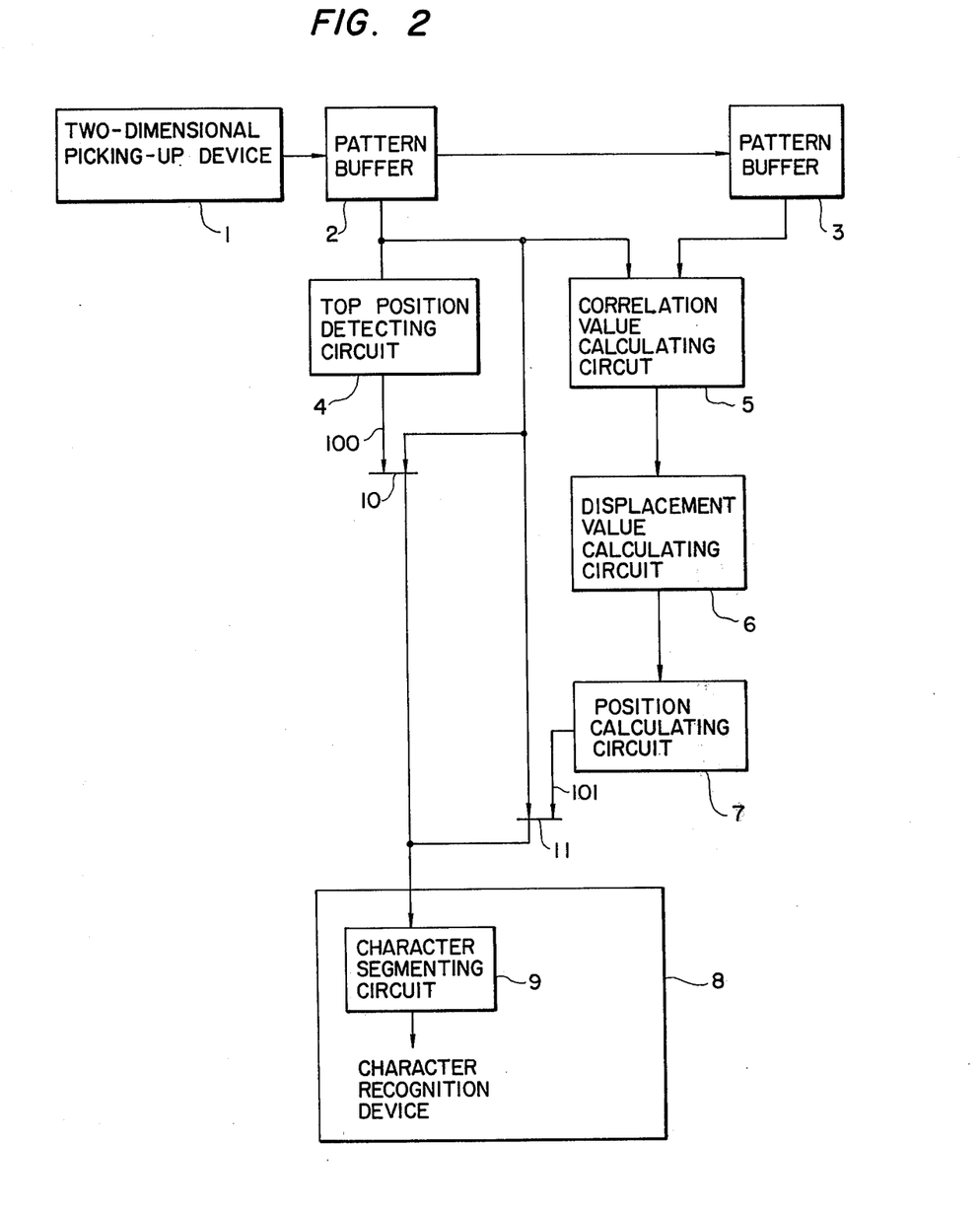
FIG. 2 is a block diagram of a first embodiment of the present invention.
Figure 3:
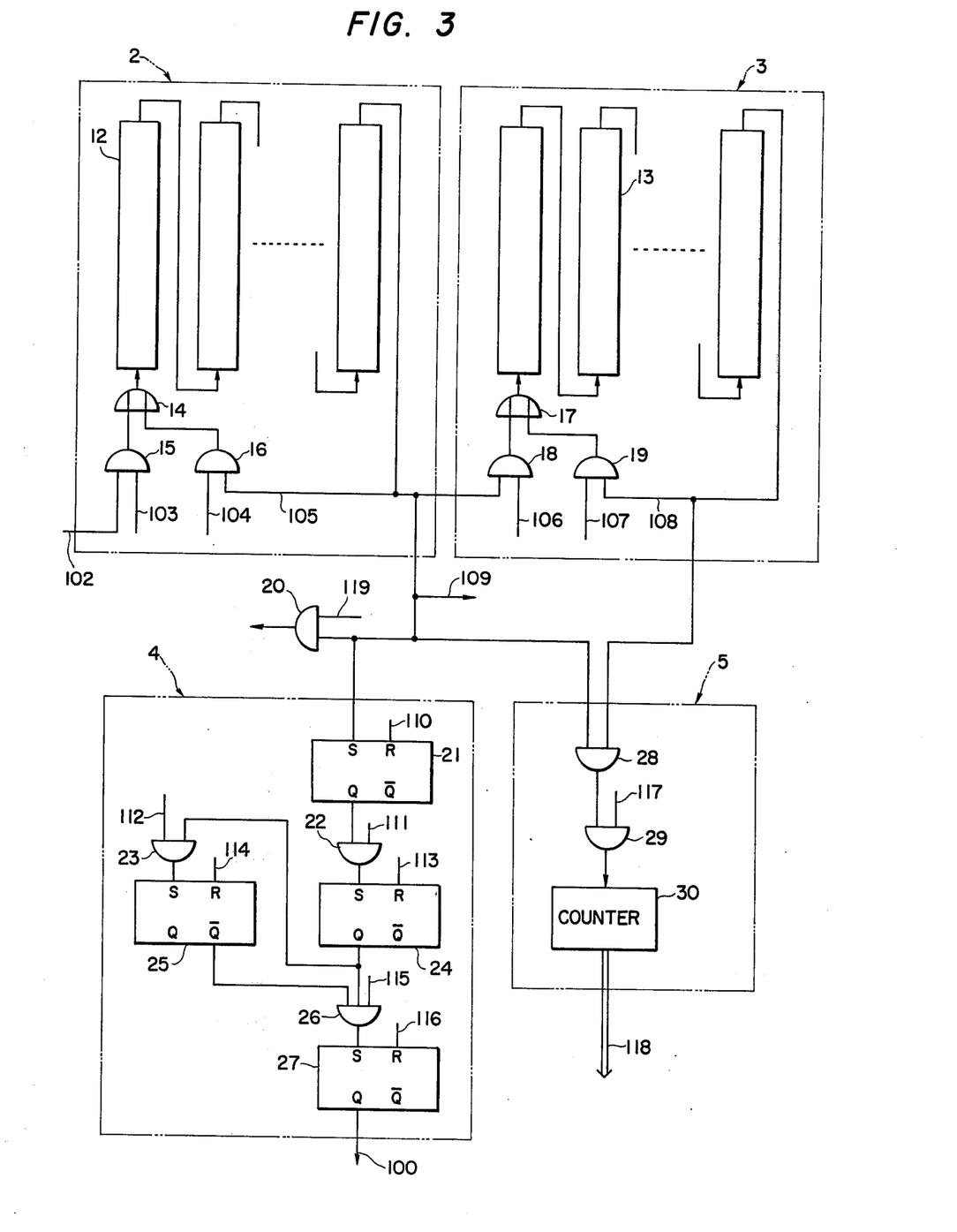
FIGS. 3 and 4 are detailed circuit diagrams thereof.
Figure 4:
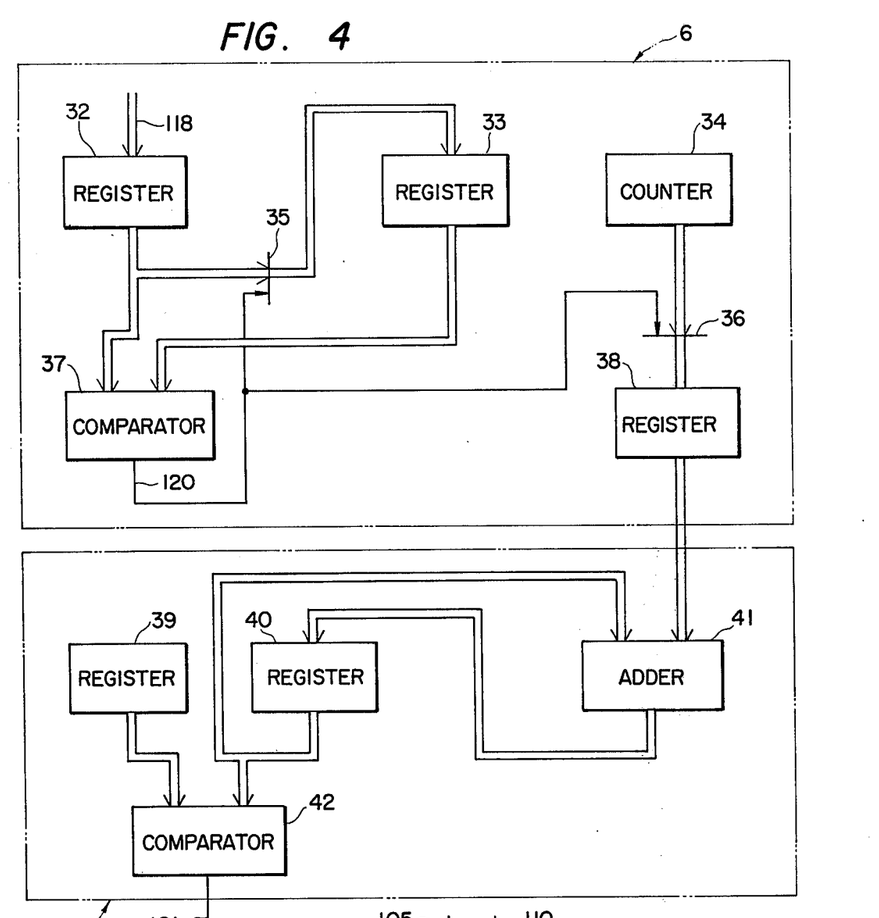

First Embodiment, FIGS. 2, 3 and 4

Next, a first embodiment of the present invention as applied to a character reader will be described with reference to FIGS. 2–4. First referring to FIG. 2, reference numeral 1 denotes a two-dimensional pickup device; 2 and 3, first and second pattern buffers; 4, a top-position detecting circuit; 5, a correlation-value calculating circuit; 6, a displacement calculating circuit; 7, a position calculating circuit; 8, a pattern recognition device; 9, a character segmenting circuit; and 10 and 11, gates. For the sake of simplicity, only data signal lines are shown in FIG. 2, but it will be understood that the devices and circuits shown are interconnected through various control signal lines.

An output from the two-dimensional pickup device 1 is stored into the pattern buffer 2 during a predetermined time interval. First, the top position of the detected character pattern is detected by the detecting circuit 4. The pattern transferring is started when the signal representative of the left boundary of the pattern is stored in the first memory location in the first buffer 2. When this condition is detected, the top-position detecting circuit 4 gives a signal 100, in response to which the gate 10 is opened to transfer the contents in the first pattern buffer 2 into the pattern or character recognition device 8. Concurrently, the contents in the first pattern buffer 2 are transferred into the second pattern buffer 3. Whenever the image signal is applied from the two-dimensional pickup device 1 to the first pattern buffer 2, the following control sequence is initiated to detect a displacement.

First, the contents stored in the pattern buffer 3 are shifted to obtain a correlation with those stored in the first pattern buffer 2. That is, after the contents in the second pattern buffer 3 have been shifted, the contents both in the first and second pattern buffers 2 and 3 are transferred into the correlation value calculating circuit 5 for obtaining the correlation value.

The circuit 5 transfers the correlation value and the shift of the contents in the second pattern buffer 3 into the displacement detecting circuit 6, where the correlation value is compared with the previously stored correlation value and the greater correlation value and its associated shift are stored in registers. When these steps are cycled, the circuit 6 obtains a maximum correlation value and its associated shift which is a relative displacement.

The relative displacement thus obtained is transferred into the position calculating circuit 7, whereas the contents in the first pattern buffer are transferred into the second pattern buffer 3 so that the information of a next character may be stored in the first pattern buffer 2. The circuit 7 obtains the sum of the displacements in response to the output from the circuit 6. Assume that after the first pattern has been transferred into the character recognition device 8, the two-dimensional pickup device 1 applies to output to the first pattern buffer 2 K times and further that the displacement between the adjacent patterns is <Li. Then the sum L of displacements is $$L = \sum_{i=1}^{K} \Delta Li$$

The circuit 7 further detects whether the sum L equals the width of the pickup field. More specifically with the pickup field of N × M squares when L = N, the sum of the displacement equals the width or N squares of the pickup field. In this case, as described above L may be within a permissible range centered around N in practice, and this condition is expressed by $L \approx N$ in this specification. When $L \approx M$ the circuit 7 gives a signal 101, in response to which the gate 11 is opened to transfer the contents of the first pattern buffer 2 into the character recognition device 8. When the picking up of patterns is controlled in the manner described above, the overlap or gap between adjacent detected patterns may be substantially eliminated so that they may be correctly and continuously transferred into the character recognition device 8. The patterns thus transferred are recognized by the character partitioning circuit 9 in a manner well known in the art.

The first and second pattern buffers 2 and 3, the top-/position detecting circuit 4 and the correlation-value circuit 5 are shown in detail in FIG. 3. They are of the serial type, but it will be understood that they may be designed for parallel operation.

In FIG. 3 the first and second pattern buffers 2 and 3 have a bank of shift registers 12 and 13, respectively, which are connected serially so that in response to a shift pulse, the contents in each shift register may be shifted by one bit. In FIG. 3, 14 and 17 are OR gates; 15, 16, 18, 20, 22, 23, 26, 28 and 29 are AND gates; 21, 24, 25 and 27 are flip-flops; and 30 is a counter.

The output from the two-dimensional pickup device 1 is transferred into the first pattern buffer 2 in the manner to be described below. It is assumed that the pickup device 1 gives output signals serially, but it may be so designed as to give parallel output signals. The output signal from the two-dimensional pickup device 1 is applied through a signal line 102 to one input terminal of the AND gate 15. When a signal 103 changes to the "1" state while a signal 104 changes to the "0" state, AND gate 15 is opened whereas AND gate 16 is closed so that the output signal from the two-dimensional pickup device 1 is applied to the shift register 12 through AND gate 15 and OR gate 14. When the synchronized shift pulses are applied to both the pickup device 1 and the shift register 12 under the above-mentioned condition, the output image may be transferred from the pickup device 1 into the first pattern buffer 2.

The shift of the contents in the first pattern buffer 2 is carried out in the manner to be described below. When the signal 103 changes to the "0" state while the signal 104 changes to the "1" state, the gate 15 is closed so that the output from the pickup device 1 may not be applied to the shift register 12. But an output signal 105 of the shift register 12 is transferred through AND gate 16 and OR gate 14 into the first shift register 12. In this manner, the contents in the first pattern buffer may be shifted as many digits as the shift pulses applied. With a N × M pickup field, the pattern is shifted by i rows when M × i shift pulses are applied. This is also true for the second pattern buffer. That is, in order to cause a shift in the contents of the second pattern buffer, a signal 106 is changed to the "0" state while a signal 107 is changed to the "1" state and a desired number of shift pulses are applied.

Next the mode of transfer of the contents in the first pattern buffer 2 into the second pattern buffer 3 will be described. The signal 103 is changed to the "0" state, the signal 107 is changed to the "0" state; the signal 106 is changed to the "1" state and the signal 107 is changed to the "0" state. Thereafter M × N shift pulses which are synchronized are applied to the shift registers 12 and 13 in both the first and second buffers 2 and 3. Then the contents in the first pattern buffer 2 may be transferred into the second buffer 3 through AND gate 18 and OR gate 17.

Next the mode of operation of the top-position detecting circuit 4 will be described. It is assumed that the output from the two-dimensional pickup device has been already transferred into the first pattern buffer 2. First in response to control signals 110, 113, 114 and 116 the flip-flops 21, 24, 25 and 27 are reset, respectively, and then M shift pulses are applied to the shift registers 12 so that their contents may be shifted by one column. When the output representative of the N-th column; that is the rightmost column includes even a single bit representative of a black elementary square which makes up an element of a character, the flip-flop 21 is set to "1". On the other hand, when the output does not include such a bit, the flip-flop 21 remains reset. After the shift by one column, the gate 22 is opened in response to a signal 111, whereby the content in the flip-flop 21 is stored in the flip-flop 24. In response to the succeeding signal 115, the logic product of the output from Q terminal of the flip-flop 25 and the output from a Q terminal of the flip-flop 24 is obtained. Thus, when the flip-flop 25 is reset while the flip-flop 24 is set, the signal "1" is derived from AND gate 26, which means that the output representative of the N-th column includes part of the character. When the flip-flop 24 remains in the reset state, no "1" signal is derived from AND gate 26.

In response to a signal 112 AND gate 23 is opened so that the content in the flip-flop 24 is transferred into the flip-flop 25.

When no "1" signal is derived from the gate 26, a number of M shift pulses are applied again to the shift registers 12 so that their contents are further shifted by one column, and this shift is stored in the flip-flop 21. In response to the next signal 111, the flip-flop 24 stores therein the content of the flip-flop 21 and the contents in the flip-flop 24 are stored in the flip-flop 25. When the contents of the last stage of shift register 12 which are transferred into the first stage of shift register 12 include a signal "1", the flip-flop 24 is set so that the signal "1" is derived from the gate 26. In like manner, the contents in the first pattern buffer 2 are shifted sequentially, and when no "1" signal is derived from the gate 26, the detection is interrupted and the next image information is transferred into the first pattern buffer 2.

In response to the "1" signal from AND gate 26, the flip-flop 27 is set to give a signal 100, and the contents of the shift registers 12 are further shifted to the initial state. Thereafter M × N shift pulses are applied to the shift registers 12 simultaneous with the opening of AND gate 20 in response to a signal 119 so that the contents in the first pattern buffer 2 are transferred into the character recognition device 8 through the gates 20 and 10 (see FIG. 2). The signal 109 is applied to the gate 11 (see FIG. 2) simultaneous with the changing of the signals 106 and 107 to the "1" and "0" states, respectively. M × N shift pulses which are synchronized with those applied to the shift registers 12 are applied to the shift registers 13 in the second pattern buffer 3 so that the contents in the first pattern buffer 2 may be serially transferred into the second pattern buffer 3. Upon completion of the transfer, the signal 116 is generated and applied to the flip-flop 27 to reset it.

Next referring still to FIG. 3, the mode of operation of the circuit 5 for obtaining the correlation value between the contents in the first and second pattern buffers 2 and 3 will be described. It is assumed that the information of the first character has been already transferred into the character recognition device 8. First, the signal 103 is changed to "0"; the signal 104, to "1"; the signal 106, to "0" and the signal 107, to "1". The counter 30 is reset to "0". Under these conditions synchronized M × N shift pulses are applied to both the shift register banks 12 and 13 in the first and second pattern buffers 2 and 3 so that the output signals 105 and 108 from the last shift registers 12 and 13 are applied to AND gate 28. As well known in the art, only when both the inputs are "1" will AND gate 28 and then AND gate 29 be opened so that the output "1" of the gate 29 is applied to and counted in the counter 30. That is, the correlation value is stored in the counter 30 and is transferred into the circuit 6 to be described in detail hereinafter. Upon completion of the transfer, a signal 117 is changed to the "0" state to reset the counter 30.

Next M shift pulses are applied to the shift register 13 in the second pattern buffer 3 to shift the contents by one column. Thereafter synchronized M × N shift pulses are applied to the shift registers 12 and 13 in the first and second pattern buffers 2 and 3 and the number of "1"s coincidently derived from the last shift registers 12 and 13 are stored in the counter 30 in the manner described above and transferred to the circuit 6. In like manner, the above steps are cycled by a predetermined number and each correlation value obtained is transferred into the circuit 6. Upon termination of the above sequential operations, the contents in the first buffer 2 are transferred into the second pattern buffer 3, and the information of the next pattern or character is transferred from the pickup device 1 into the shift registers 12 in the first pattern buffer in the manner described above to repeat the same operations described above.

Since the contents in the second pattern buffer 3 are recirculated through the shift registers 13 and gates 19 and 17, it becomes difficult to obtain the correct correlation between the first and second patterns as the number of shifts of the shift registers 13 increases, but when the relative shift between them is less, the contents in a register 38 (see FIG. 4) which correspond to a maximum correlation value stored in a register 33 (see also FIG. 4) are not adversely affected so that no problem arises.

Next the circuits 6 and 7 will be described in detail with reference to FIG. 4, wherein reference numerals 32, 33, 38, 39 and 40 are registers; 34, a counter; 37 and 42, comparators; 41, an adder; and 35 and 36, gates. The register 33 stores the maximum of the correlation values obtained so far, and the counter 34 counts up every time the contents in the second pattern buffer 3 are shifted by one column or square. That is, the counter 34 stores the relative displacement when the maximum correlation value is stored in the register 38. The correlation value is transferred from the circuit 5 (see FIG. 3) through the signal line 118 into the register 32. The contents in the register 32 will be referred to will be called "C" whereas the contents in the register 33, as "MAX" hereinafter in this specification. Both C and MAX are applied to the comparator 37, and when C > MAX, a signal 120 changes to the "1" state so that the gates 35 and 36 are opened. As a consequence, the contents in the register 32 are transferred into the register 33 whereas the contents in the register 34 are transferred into the register 38. Therefore the register 38 stores the displacement which gives the maximum correlation value. If C ≦ MAX, the contents in the registers 33 and 38 remain unchanged.

After the contents in the shift registers 13 have been shifted by a predetermined number of columns or squares so that a correlation value is obtained, the contents in the register 38 are transferred into the adder 41 and the register 33 and the counter 34 are reset.

The circuit 7 calculates the sum of displacements after the information of the first pattern has been transferred into the character recognition device 8. The register 40 stores the sum L of displacements and the register 39 stores the width N of the pickup field. Every time the displacement is applied from the register 38 to the adder 41, the latter adds the displacement to the contents in the register 40. That is, $L + \Delta L$ is stored in the register 40. The comparator 42 compares N (the contents in the register 39) with L; that is, the contents in the register 40. When N equals L or N equals substantially L, a signal "1" is derived. When N is not equal to L, the above steps are cycled until N = L; that is, until the signal 101 becomes "1".

When the signal 101 becomes "1", M × N shift pulses are applied to the shift registers 12 in the first pattern buffer so that their contents 109 are transferred through the gate 11 into the character recognition device 8 and then the register 40 is reset. Thereafter the contents in the registers 12 are transferred into the shift registers 13 in the second pattern buffer 3, and the output from the pickup device 1 is transferred into the shift registers 12 in the first pattern buffer 2. Thus the operations are cycled again so that the contents in the shift registers 12 are transferred into the character recognition device 8. During this process, the top-position detecting circuit 4 remains deactivated.

Figure 5:
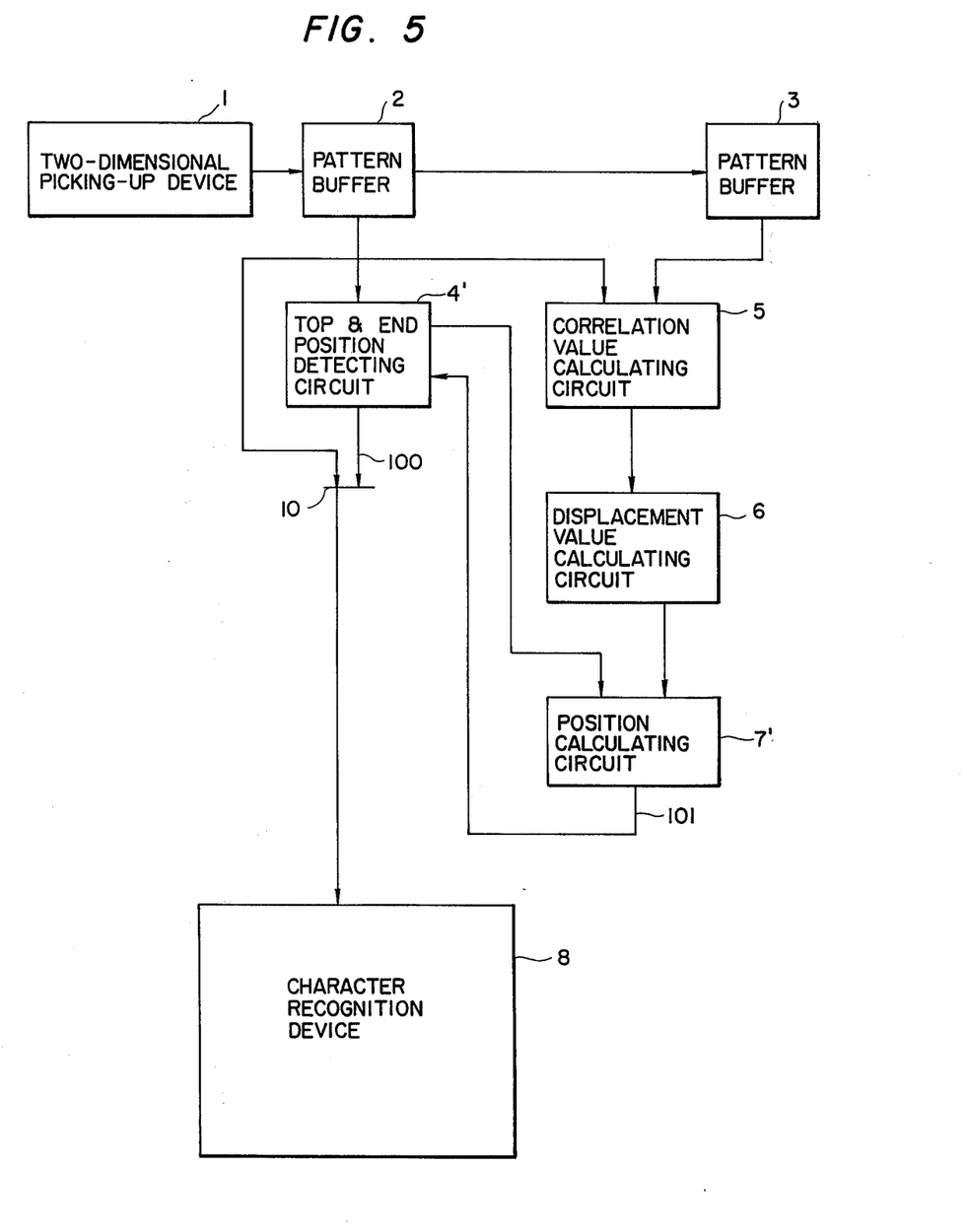
FIG. 5 is a block diagram of a second embodiment of the present invention.
Figure 6:
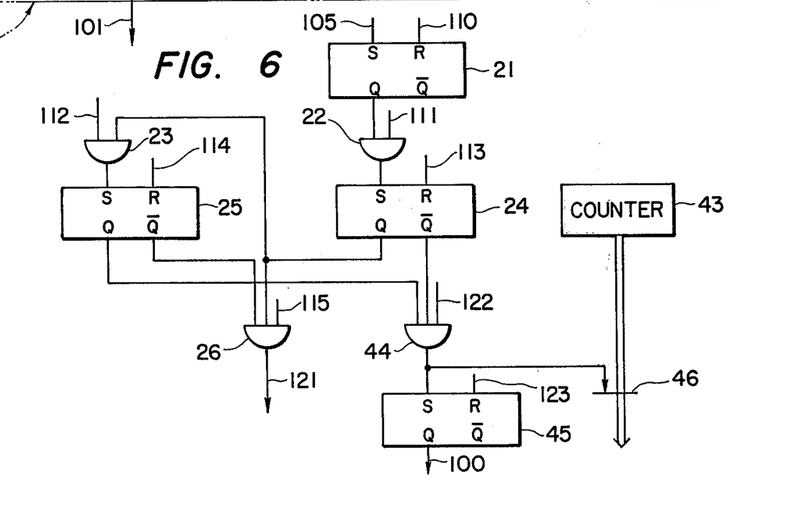
FIG. 6 is a detailed diagram of a top- and end-position detecting circuit thereof.

Second Embodiment, FIGS. 5 and 6

In FIG. 5 there is shown in block diagram a second embodiment of the present invention which is substantially similar in construction to the first embodiment shown in FIG. 2 except that a circuit 4' detects both the top and end positions of a character, thereby obtaining the distance H therebetween and applying it to a circuit 7'. The circuit 7' is substantially similar in mode of operation to the circuit 7 shown in FIG. 2 except that instead of comparing L and N it compares H or output from the circuit 4' with L.

The system shown in FIG. 5 is very effective when there exists a sufficient gap between the adjacent characters; that is, when the adjacent characters are not made into contact with each other. More specifically each character is segmented or partitioned by the detection of the top and end positions of a character so that the character recognition device 8 may eliminate the character segmenting or partitioning device.

In the second embodiment shown in FIG. 5, the output from the two-dimensional picking-up device 1 is stored at a predetermined time interval into the first pattern buffer 2. The circuit 4' detects first the top position of the character and then the end position thereof. In this specification, the end position refers to the state wherein one of the adjacent scanning lines includes a black elementary square or area while the other does not include any. The circuit 4' detects the width H between the top and end positions and applies it to the circuit 7'. Thereafter in response to the signal 100, the gate 10 is opened so that only the character portions of the pattern stored in the first pattern buffer 2 are transferred into the character recognition device 8. Concurrently the contents in the first pattern buffer 2 are transferred into the second pattern buffer 3. Whenever the output from the two-dimensional picking-up device 1 is transferred at a predetermined time interval to the first pattern buffer, the displacement is detected in a manner to be described below.

As described previously, the contents in the second pattern buffer 3 are shifted and compared with the contents in the first pattern buffer 2 in order to obtain a correlation value between them. The displacement is obtained from the number of shifts which gives a maximum correlation value. The displacement thus obtained is transferred into the circuit 7' concurrent with the transfer of the contents in the first pattern buffer into the second pattern buffer 3 so that the next output from the two-dimensional picking-up device 1 may be transferred into the first pattern buffer 2. The circuit 7' calculates the displacement L. When L = H the signal 101 which is in the state "1" is transferred into the circuit 4', the circuit 4' then detects the top and end positions of the pattern stored in the first pattern buffer 2 in the manner described above, thereby calculating the width H and applying it to the circuit 7'. In response to the signal 100 generated during a period from the detection of the top position to the detection of the end position, the gate 10 is opened so that only the character portions of the pattern in the first buffer 2 are transferred into the character recognition device 8. Thus in the second embodiment only the character portions are partitioned and transferred into the character recognition device 8 so that the latter may eliminate a character segmenting device.

The circuits 2, 3, 5, 6 and 7' shown in FIG. 5 are substantially similar to the correspondingly identified circuits shown in detail in FIGS. 3 and 4.

The top and end-position detecting circuit 4' is shown in detail in FIG. 6. and includes, in addition to the components similar to those shown in FIG. 3, a counter 43, and AND gate 44, a flip-flop 45 and a gate 46. The circuit 4' detects the top position in the manner described above with reference to FIG. 3. Upon detection of the top position, the signal 121 changes to the "1" state, and the number of shifts in the shift registers 12 (See FIG. 3) at which the top position is detected is stored in a register while the operation for detecting the end position is initiated. To this end, M shift pulses are applied to the shift registers 12 in the first pattern buffer 2, and, as described above with reference to FIG. 3, when the output signals for each column include even one signal representative of a black elementary square, the flip-flop 21 is set, and in response to the signal 111 the gate 22 is opened so that the content of the flip-flop 21 is transferred into the flip-flop 24. However, even when the signals 115 and 122 are applied to the gates 26 and 44, respectively, the output signals therefrom are "0". In response to the reset of the flip-flop 24, the content in the counter 43 increases by 1. In like manner, another set of M shift pulses are applied to the shift registers 12 and this shift is stored in the flip-flop 25 while the counter 43 increments by one. In like manner the above operations are cycled and there is a time when the preceding set of the output signals for the adjacent columns or squares includes the signal representative of a black elementary square, but the following set does not include such a signal. That is, the end position of the character is detected. In response to the following or succeeding set of output signals including no signal representing a black element, the flip-flop 24 is reset, and in response to the signal 122, the signal "1" is derived from the gate 44 so that the flip-flop 45 is set to give the output signal 100 which is in the "1" state. Concurrently the gate 46 is opened so that the content in the counter 43 is transferred into the circuit 7' shown in FIG. 5. The transferred content represents the distance H between the top and end positions of the character.

When the gate 44 is opened so that the signal "1" is derived in the manner described above, the information representative of the top position and the content H in the counter 43 are used in such a way that the top position or the output signals for the first column or square may be stored in the last shift register 12 in the first pattern buffer 2. Thereafter in response to the signal 119 the gate 20 is opened (See FIG. 3) and the contents in the shift registers 12 are shifted by columns or squares corresponding to the distance H and the output signals are transferred through gates 20 and 10 into the character recognition device 8. Thereafter in response to the signal 123, the flip-flop 45 is reset.

The circuits 6 and 7' shown in FIG. 5 may be substantially similar in construction to those shown in FIG. 4 except that the content in the counter 43 in the detecting circuit 4' is stored into a register 39 in the circuit 7'.

After the first pattern has been transferred into the character recognition device 8, the contents in the shift registers 12 are transferred into the shift registers 13 in the second pattern buffer in the manner described above, and a new information is transferred into the shift registers 12. The correlation value between them is obtained by the circuit 5, and the displacement is obtained by the circuit 6 and is transmitted to the circuit 7'. In the latter, the sum or accumulated value L of displacements and the distance H are compared, and when they are substantially equal, the output signal 101 changes to the "1" state. As a result, the detecting circuit 4' detects the top of and end positions of the character stored in the shift registers in the manner described above, and the character portions between them are transferred into the character recognition device 8. Concurrently the distance H between them is transferred into the circuit 7'. The above operations are cycled so that only the character portions of the patterns (fields) may be transferred into the character recognition device 8.

As described above, according to the second embodiment the displacement between the adjacent patterns picked up may be detected and based upon the detected displacement the patterns may be correctly picked up one by one without the overlap or gap between them. When the adjacent characters are spaced apart from each other by a sufficient distance, they may be segmented or partitioned from each other so that a character segmenting or paritioning circuit in the character recognition device may be eliminated.

Meanwhile an optical character recognition device is interconnected to a character scanner, a display device, a recognition key which is depressed in response to the result shown in the display device for generating a recognition signal to be applied to the character recognition device and a keyboard for correcting an erroeneously picked up and recognized pattern. A pattern picked up by a manual scanner is recognized and the recognized pattern is displayed. However when the picked up pattern is displaced or distorted vertically or when the scanning speed is too fast or slow, the erroneous recognition results and the "bad" pattern is rejected. When an operator checks the result from the pattern displayed, a relatively long time is required. Therefore it is preferable to provide an alarm device which gives an alarm signal when a pattern is misinterpreted so that the operator may repeat the scanning. Therefore when the operator repeats the scanning whenever an alarm signal is generated, the correct recognition of a pattern may be ensured. Thereafter the recognition key is depressed to give the recognition output to an output device.

Figure 7:
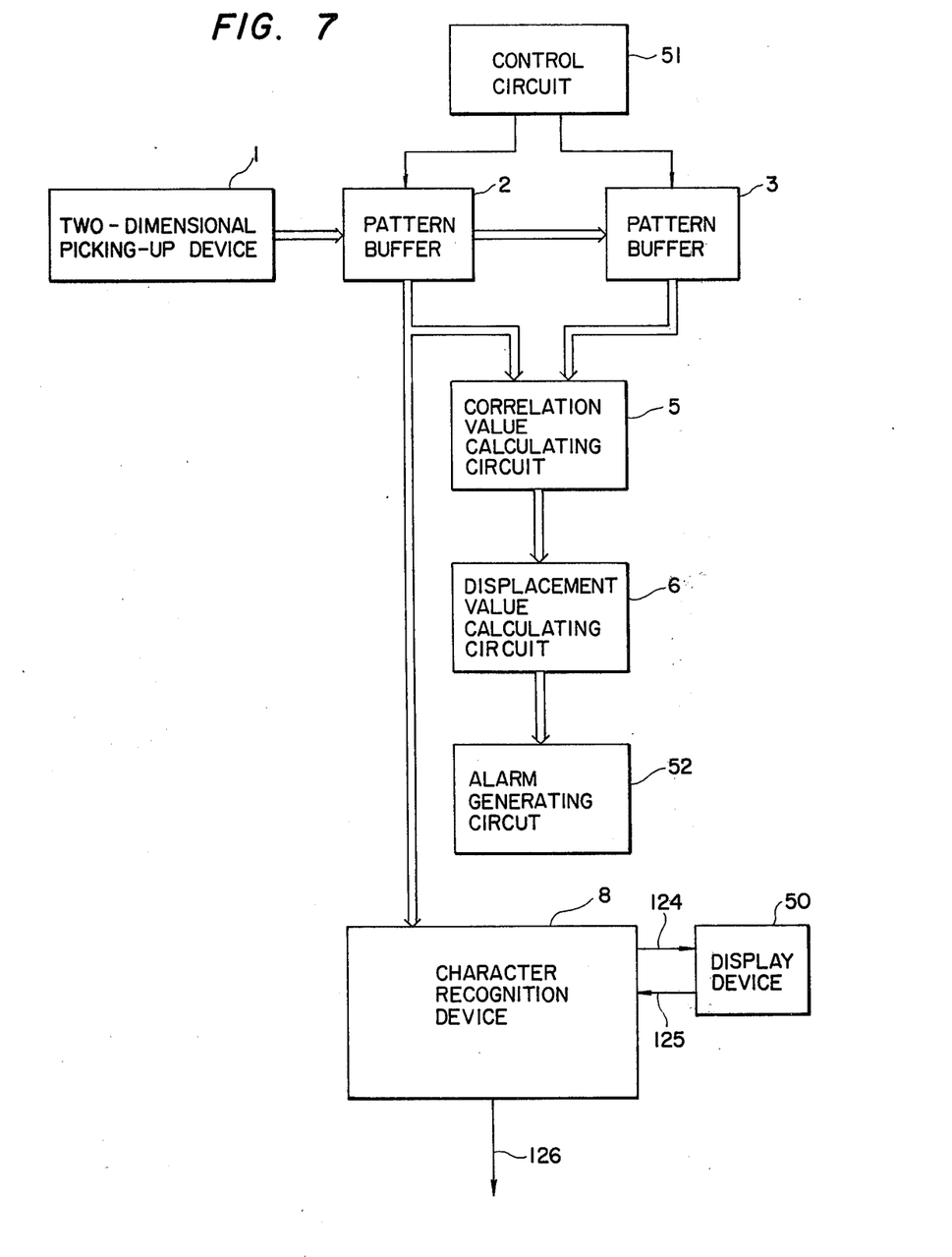
FIG. 7 is a block diagram of a third embodiment of the present invention.
Figure 8:
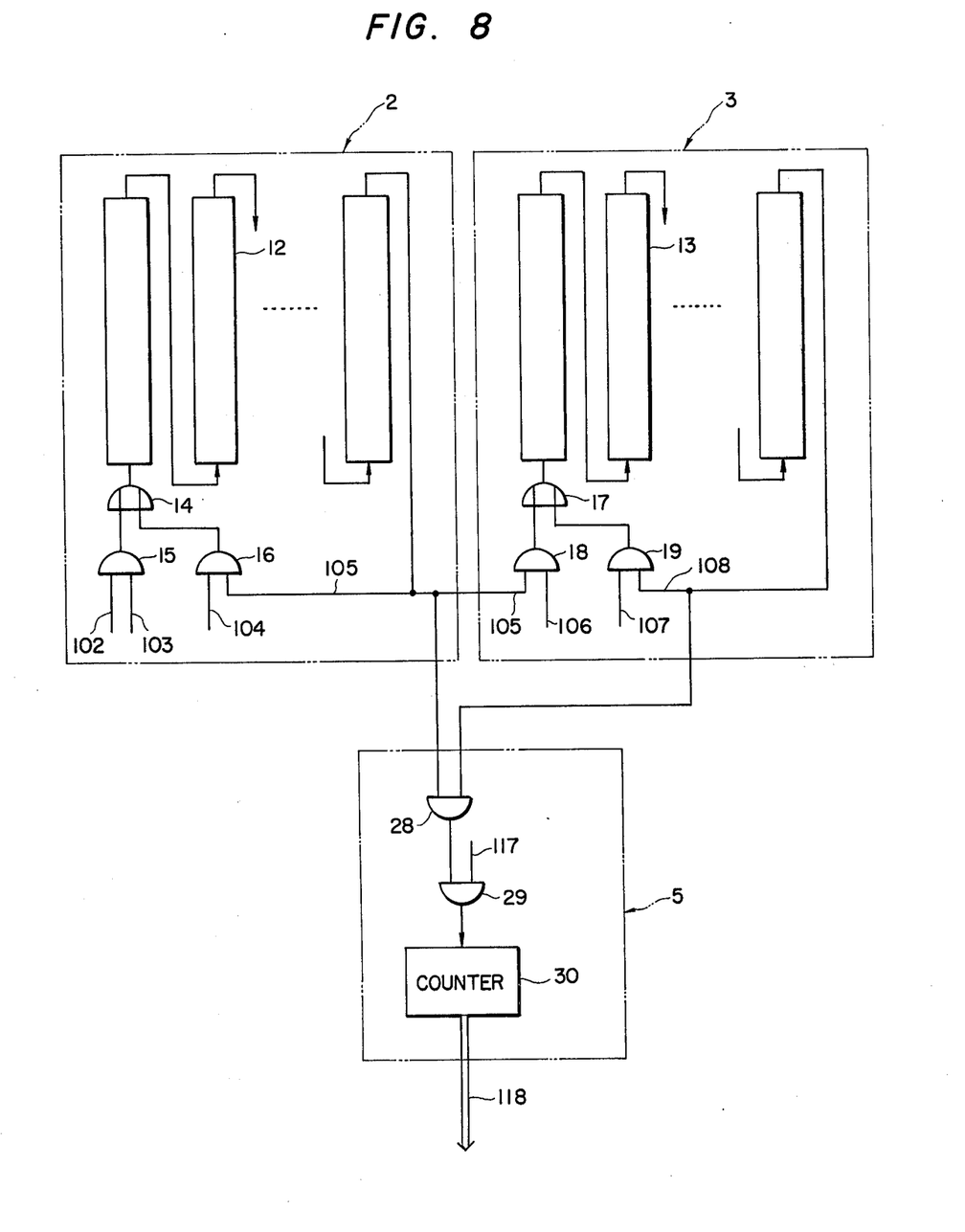
FIGS. 8 and 9 are detailed circuit diagrams thereof.
Figure 9:
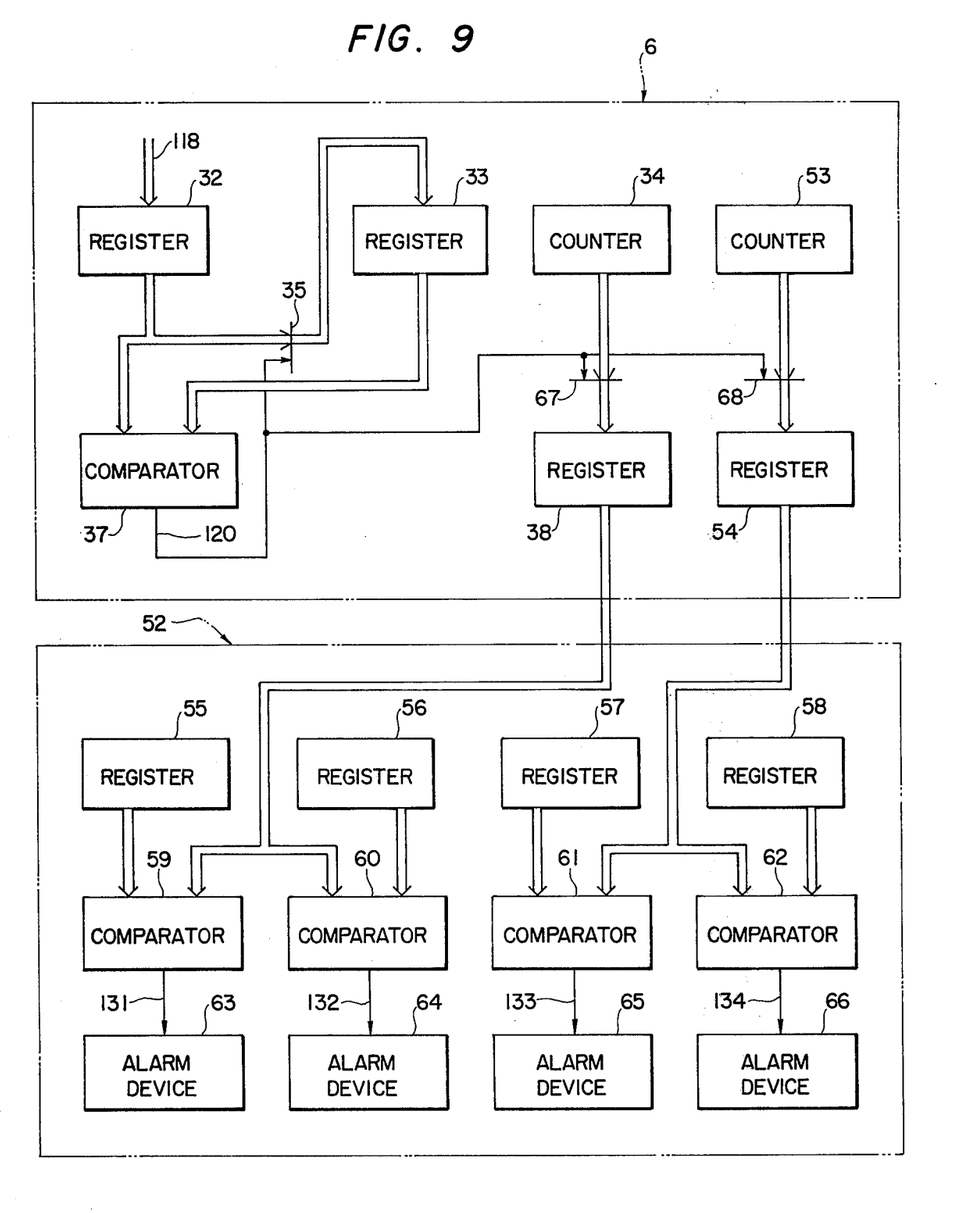

Third Embodiment, FIGS. 7, 8 and 9

In FIG. 7 there is shown a third embodiment of the present invention provided with the alarm device of the type described above. The third embodiment is substantially similar in construction to the first embodiment shown in FIG. 2 except that a display device, a control circuit 51, and an alarm generating circuit 52 are further provided. The shift registers 12 and 13 in the first and second pattern buffers 2 and 3 are controlled by the control circuit 51.

As in the first embodiment, the output from the two-dimensional picking-up device 1 is transferred into the first pattern buffer 2 and the pattern which has been previously picked up is stored in the second pattern buffer 3. Under the control of the control circuit 51 the contents in the first and second pattern buffers 2 and 3 are transferred into the correlation-value calculating circuit 5 and the correlation value obtained by the circuit 5 is applied to the displacement calculating circuit 6. The calculation of the correlation value is excuted whenever the contents stored in the second pattern buffer 3 are shifted by a predetermined digit or column to the left (right) or top (bottom) under the control of the control circuit 51. The correlation value thus obtained is applied to the circuit 6 which obtains a maximum correlation value and the number of shifts of the contents in the second pattern buffer 3 which number gives the maximum correlation value. The alarm generating circuit 52 detects based upon the number of shifts obtained by the circuit 6 how many squares the pattern is displaced vertically or horizontally and gives the alarm signal when the displacement is in excess of a predetermined displacement. More specifically let the horizontal displacement to the left (or right) be denoted by $\Delta X$, the vertical displacement to the upward by $\Delta Y$, and predetermined values or thresholds by $T_1$, $T_2$ and $T_3$. Then when $$\Delta X < T_1$$

the signal "TOO SLOW" is generated, but when $$\Delta X > T_2$$

the signal "TOO FAST" is generated. When $$\Delta Y > T_3$$

the signal "UPWARD DISPLACEMENT" is generated, but when
$$\Delta Y < -T_3$$

the signal "DOWNWARD DISPLACEMENT" is generated.

Meanwhile, the output from the picking-up device 1 is transferred through the first pattern buffer 2 into the character recognition device 8 which is connected to the display device for displaying the character picked up. The display device 50 includes a recognition key which is depressed by an operator after he had perceived the pattern shown on the display device 50 and a keyboard for correcting the reading.

That is, the pattern read by the character recognition device 8 is transmitted as the signal 124 to the display device 50 for display, and when the operator recognizes the pattern displayed, he depresses the recognition key to generate a signal 125 which is transmitted to the character recognition device 8 which in turn gives the output signal 126 to an output device. When erroneous recognition results, the operator operates the keyboard for correction and repeats the scanning for correct recognition. When the operator is unskilled so that he scans too fast or slow or not in parallel with the scanning direction, the misinterpretation or reject by the character recognition device 8 increases. It will take a long time if the correction is made after the operator has checked the pattern displayed on the display device 50 and repeats the scanning. To overcome this problem, the third embodiment of the present invention gives the alarm signal in case of the mis-recognition or reject so that the operator may immediately repeat the scanning for correct recognition.

According to the third embodiment of the present invention the too fast or too slow scanning and/or the upward or downward displacement in scanning due to the unskilledness of the operator may be immediately detected and the alarm signal is generated to warn the misoperation so that the operator may immediately repeat the scanning. In response to the alarm signal, the operator may immediately recognize whether his operation or scanning was right or wrong so that he may aquire the correct method for scanning within a short training period.

The third embodiment shown in FIG. 7 may further include the top-position detecting circuit 4 and the position calculating circuit 7 shown in FIG. 2 or the top- and end-position detecting circuit 4' and the position calculating circuit 7' shown in FIG. 5.

The first and second pattern buffers 2 and 3 and the correlation-value calculating circuit 5 are shown in detail in FIG. 8. In this embodiment the serial operation is employed, but it will be understood that the same result can be attained by the parallel operation. The circuits shown in FIG. 8 are similar in both construction and mode of operation to those shown in FIG. 3.

In FIG. 8, the patterns are stored in the serially-connected shift registers 12 and 13. The output from the last shift register 12 is transferred into the first shift register through AND gate 16 and OR gate 14 and into the shift registers 13 in the second pattern buffer through AND gate 18 and OR gate 17. The contents in the shift registers 13 are circulated through AND gate 19 and OR gate 17. AND gates 15, 16, 18 and 19 are opened or closed in order to transfer the patterns into the shift registers 12 and 13 and shift them. For instance, the output from the two-dimensional picking-up device 1 is transmitted through the signal line 102 to the gate 15, and the signal line 103 is changed to the "1" state whereas the signal line 104, to the "0" state. When synchronized shift pulses are applied to the picking-up device 1 and the shift registers 12 in the first buffer 2, the output from the former is stored in the shift registers 12.

Next the mode of operation for transferring the contents in the first pattern buffer 2 into the second pattern buffer 3 will be described. First, the signals 103 and 104 are set to "0", the signal 106, to "1" and the signal 107, to "0", and synchronized shift pulses are applied to the shift registers 12 and 13. With a receptor pattern of N × M squares, N × M shift pulses are applied.

To shift the contents in the first pattern buffer 2, the signal 104 is changed to "0" whereas the signal 103, to "1", and a required number of shift pulses are applied to the shift registers 12. For instance in order to shift the contents by one bit, one shift pulse is applied and in order to shift by one column or row, M shift pulses are applied.

In response to the patterns stored in the first and second pattern buffers 2 and 3, the correlation-value calculating circuit 5 obtains a correlation value between them. To this end, the signal 103 is changed to the "0" state; the signal 106, to the "0" state; the signal 104, to the "1" state and the signal 107, to the "1" state, and thereafter the counter 30 is cleared. Synchronized shift pulses equal to N × M are applied to both the shift registers 12 and 13 so that the outputs from them are transferred through the signal lines 105 and 108 into the gate 28. When both the outputs are "1" simultaneously, the output "1" is derived from the gate 29 to increment the counter 30 by one. When the last shift pulse is applied, the correlation value between the patterns stored in the first and second pattern buffers 2 and 3 is stored in the counter 30, and is transmitted through the signal line 118 to the circuit 6 shown in FIG. 7.

The circuit 6 and the alarm generating circuit 52 are shown in detail in FIG. 9. The correlation value C is stored in the register 32; the maximum correlation value MAX, in the register 33; the shifts to the left (or right) which give the maximum correlation value MAX, in the register 38; and the shifts to upward (or downward) which give the maximum correlation value MAX, in a register 54. The shifts of the patterns cause the contents of the counters 34 and 53 to increment. That is, each time the pattern is shifted by one column or square to the left or right, the counter 34 increments by + one. In like manner, whenever the pattern is shifted upward or downward by one bit the counter 53 increments by + 1. The horizontal or vertical shift is controlled by the signals from the control circuit 51.

It is assumed that the horizontal shift to the left or right COLM is stored in the counter 34; the vertical shift upward or downward LINE is stored in the counter 53 and the maximum correlation value MAX ever obtained is stored in the register 33. The correlation value C is derived from the circuit 5 and is stored in the register 32. The contents in the registers 32 and 33 are transferred into the comparator 37 and if C>MAX the signal 120 changes to the "1" state so that the gates 35, 67 and 68 are opened to transfer the content in the register 32 into the register 33, to transfer the content in the register 34 into the register 38 and to transfer the content in the counter 53 into the register 54. Thus the maximum correlation value MAX is stored in the register 33 and the associated horizontal and vertical shifts COLMM and LINEM are stored in the registers 38 and 54, respectively. If C≦MAX, the contents in the registers 33, 38 and 54 remain unchanged.

Under the control of the shift control circuit 51, the contents in the second buffer 3 are shifted by bit by bit so that the correlation value and the maximum correlation value are obtained in the manner described above and corresponding horizontal and vertical shifts are stored in the registers 38 and 54, respectively. When the contents in the second pattern buffer 3 are shifted by a predetermined number of columns and rows, the alarm generating circuit 52 compares a predetermined value or reference with the horizontal or vertical shift and gives the alarm signal if the shift or displacement is in excess of the reference.

It is assumed that the maximum permissible displacement in the horizontal direction CX is stored in a register 55; the minimum horizontal displacement CN, in a register 56; the permissible upward displacement LX is stored in a register 57; and the permissible downward displacement LN, in a register 58.

A comparator 59 compares the content CX in the register 55 with the content COLMM in the register 38, and when CX<COLMM the signal 131 changes to the "1" state so that an alarm device 63 is activated to generate the signal "TOO FAST". A comparator 60 compares the content CN in the register 56 with the content COLMM in the register 38 and when CN>COLMM the signal 132 changes to "1" so that an alarm device 64 is actuated to give the signal "TOO SLOW". A comparator 61 compares the content LX in the register 57 with the content LINEM in the register 54 and if LX<LINEM the signal 133 changes to "1" an alarm device 65 is actuated to generate the signal "UPWARD DISPLACEMENT". A fourth comparator 62 compares the content LN in the register 58 with the content LINEM in the register 53 and if LN>LINEM the signal 134 changes to the "1" state so that a fourth alarm device 66 is actuated to generate the signal "DOWNWARD DISPLACEMENT".

So far the third embodiment has been described as giving the four alarm signals "TOO FAST", "TOO SLOW", "UPWARD DISPLACEMENT" and "DOWNWARD DISPLACEMENT", but it is not necessary to give all of these alarm signals. That is, one or more of them may be generated as needs demand.

What is claimed is:

1. A device for detecting the displacement between successive fields of a pattern being scanned in a predetermined direction comprising:
   first means for storing signals representing a field of said pattern detected at a selected interval;
   second means connected to said first means for storing the signals which were stored in said first means during a previous interval, which field in said second means is relatively displaced in position with respect to the field now in said first means;
   third means for obtaining correlation values between the first and second fields stored in said first and second means during a given interval by comparing the signals stored in said respective means as said fields are shifted relative to each other within said first and second means during said given interval by predetermined amounts;
   fourth means for deriving as the position displacement between the successive fields a value corresponding to the number of relative shifts required to obtain a maximum correlation value from said third means.

2. A device as set forth in claim 1 in which said first and second means comprise memory means for storing the signals representing said successive fields.

3. A displacement detection device comprising:
   first means for detecting a pattern at selected time intervals in successive fields in a scanning direction;
   second means for storing signals representing the field of the pattern picked up by said first means;
   third means connected to said second means for storing the signals which were stored in said second means during the immediately previous time interval and which represent a field which is relatively displaced in position with respect to the field now in said second means;
   fourth means for obtaining the correlation value between the successive fields of the pattern stored in said second and third means during a given interval by comparing the signals stored in said second and third means,;
   fifth means for shifting the field stored in one of said second and third means relative to the other by a selected amount during said given interval; and
   sixth means for deriving as the position displacement between the successive fields of the pattern a value corresponding to the number of shifts required to obtain the maximum correlation value between the fields stored in said second and third means.

4. A device as set forth in claim 3 further comprising seventh means for reading out the signals representing the field stored in said second means when the sum of the displacement derived by said sixth means reaches a predetermined value.

5. A device as set forth in claim 3 further comprising seventh means for detecting the top position of the field stored in said second means, and eighth means for reading out said field stored in said second means when said seventh means detects said top position.

6. A device as set forth in claim 3 further comprising seventh means for detecting the top and end positions of said field stored in said second means, and eighth means for reading out the pattern data between said top and end position detected by said seventh means.

7. A device as set forth in claim 3 wherein said first means is a two-dimensional pickup device.

8. A device as set forth in claim 3 further comprising seventh means for detecting whether the displacement detected by said sixth means is within a predetermined range, and eighth means for giving an alarm signal when said displacement is outside of said predetermined range.

9. A device as set forth in claim 3 in which said second and third means comprise first and second shift registers, respectively.

10. A device as set forth in claim 9 in which said second means further includes means for transferring the pattern picked up by said first means to said first shift register and means for recirculating the contents of said first shift register and said third means further includes means for transferring the contents of said first shift register to said second shift register and means for recirculating the contents of said second shift register.

11. A device as set forth in claim 10, in which said fourth means comprises means for detecting the coincidence between the outputs of said first and second shift registers and means for counting the number of the coincidences detected by said detecting means.

* * * * *